(12) United States Patent
Florenca

(10) Patent No.: US 6,392,648 B1
(45) Date of Patent: May 21, 2002

(54) THREE DIMENSIONAL GRAPHICAL DISPLAY GENERATING SYSTEM AND METHOD

(76) Inventor: Isaiah Florenca, 13 Maxwell Street, Beaconsfield Western Australia 6162 (AU)

( * ) Notice: Subject to any disclaimer, the term of this patent is extended or adjusted under 35 U.S.C. 154(b) by 0 days.

(21) Appl. No.: 09/423,225
(22) PCT Filed: May 5, 1998
(86) PCT No.: PCT/AU98/00321
§ 371 Date: Oct. 4, 1999
§ 102(e) Date: Oct. 4, 1999
(87) PCT Pub. No.: WO98/50870
PCT Pub. Date: Nov. 12, 1998

(30) Foreign Application Priority Data

May 6, 1997 (AU) .............................................. P06617

(51) Int. Cl.[7] .............................................. G06T 17/00
(52) U.S. Cl. ...................................................... 345/427
(58) Field of Search ................................ 345/418, 419, 345/420, 423, 424, 425, 427

(56) References Cited

U.S. PATENT DOCUMENTS 5,341,461 A * 8/1994 Kikuchi et al.
5,561,790 A * 10/1996 Fusaro
5,701,403 A * 12/1997 Watanabe et al.

* cited by examiner

*Primary Examiner*—Cliff N. Vo
(74) *Attorney, Agent, or Firm*—Michael Best & Friedrich LLP (57) ABSTRACT

A graphical display generating system for modelling three dimensional objects on a two dimensional graphical display, the system comprising: input means for generating raw data representative of discrete three dimensional points of said object; first processing means for receiving and processing said raw data from said input means by transposing said raw data into processed data representative of said discrete points in a three dimensional spatial array, the transposition being performed in accordance with a first mathematical algorithm; second processing means for receiving and further processing said processed data by transforming said processed data into display data representative of said discrete points in a two dimensional display array, the transformation being performed in accordance with a second mathematical algorithm; and display means for graphically displaying the image represented by said display data in said two dimensional display array.

12 Claims, 4 Drawing Sheets

THREE DIMENSIONAL GRAPHICAL DISPLAY GENERATING SYSTEM AND METHOD

FIELD OF THE INVENTION

This invention relates to a graphical display generating system and a method of generating a graphical display for modelling true to scale three dimensional objects on a two dimensional graphical display.

The invention has particular utility in computer aided design (CAD) applications for technical and architectural drawing or modelling as well as other applications where 3-D data needs to be input quickly and interactively.

BACKGROUND TO THE INVENTION

Present CAD systems are not practically adapted for pure technical and architectural drawing requirements, and although such systems find utility with graphic artists and designers, due to their complexity they have not been widely accepted by technical draftsmen and architects for the production of technical and engineering drawings of measured three dimensional objects.

In general, the problems associated with inputting measured three dimensional data using current three dimensional CAD software programmes/systems are:

(i) The drawing process is extremely complicated.

(ii) Three dimensional CAD software programs cannot move the cursor/pointer through the three dimensional space leaving a trail behind which represents a measured line and draw with six degrees of freedom inside the three dimensional space.

(iii) Current three dimensional CAD software programs do not permit information to be inputted directly in three dimensional form by, using a cursor/pointer and maintain on screen:
  A. real measured drawings/data
  B. the operator knowing where he is at all times, and
  C. knowing the distance from one object to another, without reference to two dimensional plans, sections or elevations.

(iv) They consume an enormous amount of time in entering measured data and creating a true to scale three dimensional image on a two dimensional screen.

SUMMARY OF THE INVENTION

It is an object of the present invention to provide an improved and simpler system and method of entering measured three dimensional data and creating a two dimensional image of a true to scale three dimensional object which overcomes or at least mitigates some, if not all, of the aforementioned disadvantages associated with CAD systems.

In accordance with a first aspect of the present invention, there is provided a graphical display generating system for modelling measured three dimensional objects on a two dimensional graphical display, the system comprising:

input means for generating raw data representative of discrete three dimensional points of said object;

first processing means for receiving and processing said raw data from said input means by transposing said raw data into processed data representative of said discrete points in a three dimensional spatial array, the transposition being performed in accordance with a first mathematical algorithm;

second processing means for receiving and further processing said processed data by transforming said processed data into display data representative of said discrete points in a two dimensional display array, the transformation being performed in accordance with a second mathematical algorithm; and, display means for graphically displaying the image represented by said display data in said two dimensional display array.

Preferably, said first mathematical algorithm comprises a transposition of data to three dimensional cartesian co-ordinates.

Preferably, said second mathematical algorithm comprises a transformation of data in three dimensional cartesian co-ordinates to two dimensional oblique co-ordinates using the formulae:

$$\text{Display X} = \text{Processed X} + (\text{Processed Z} \times (a/m))$$

$$\text{Display Y} = \text{Processed Y} + (\text{Processed Z} \times (b/m));$$

where:

Display X is the abscissa and Display Y is the ordinate of the display data,

Processed X, Processed Y and Processed Z are the corresponding abscissa, ordinate and Z-axis components of the processed data, and m, a and b are the projection parameters for the display data where m is the scale for the X and Y co-ordinates of the display data, a is the abscissa component of the Z-axis projection of the display data, and b is the ordinate component of the Z-axis projection of the display data.

Preferably, said system further includes a database means for receiving and storing said processed data in a prescribed data structure.

Preferably, said second processing means receives said processed data from either said first processing means or said database means.

Preferably, said prescribed data structure is a two dimensional array in the form of a look-up table.

Advantageously said input means comprises cursor positioning means for moving a cursor on a two dimensional simulation of measured three dimensional space.

In accordance with another aspect of the present invention, there is provided a method of generating a graphical display for modelling three dimensional objects on a two dimensional graphical display, the method comprising the steps of:

generating raw data representative of discrete three dimensional points of said object;

transposing said raw data into processed data representative of said points in a three dimensional spatial array in accordance with a first mathematical algorithm;

transforming said processed data into display data representative of said discrete points in a two dimensional spatial array in accordance with a second mathematical algorithm; and graphically displaying said display data in said two dimensional spatial array.

Preferably, said first mathematical algorithm comprises a transposition of data to three dimensional cartesian co-ordinates.

Preferably, said second mathematical algorithm comprises a transformation of data in three dimensional cartesian co-ordinates to two dimensional oblique co-ordinates using the formulae:

Display X=Processed X+(Processed Z×(a/m))

Display Y=Processed Y+(Processed z×(b/m));

where:

Display X is the abscissa and Display Y is the ordinate of the display data, processed X, Processed Y and Processed Z are the corresponding abscissa, ordinate and Z-axis components of the processed data, and m, a and b are the projection parameters for the display data where m is the scale for the X and Y co-ordinates of the display data, a is the abscissa component of the Z-axis projection of the display data, and b is the ordinate component of the Z-axis projection of the display data.

BRIEF DESCRIPTION OF THE DRAWINGS

The invention will be better understood in the light of the following description of one specific embodiment thereof. The description is made, by way of example only, with is reference to the accompanying drawings, wherein.

DETAILED DESCRIPTION OF PREFERRED EMBODIMENT

The described embodiment is directed towards a CAD system for orthogonal modelling of three dimensional data, hereinafter referred to as the orthogonal modelling system. The orthogonal modelling system comprises a conventional computer for CAD purposes having the usual central processing unit, memory, input peripherals such as keyboard, mouse, digitiser etc. output peripherals in the form of a graphical display such as a display screen, printer, plotter and the like, and software including the usual operating systems software. The system also includes an applications software which, when invoked, operates the computer in a manner to form the orthogonal modelling system.

Figure 1:
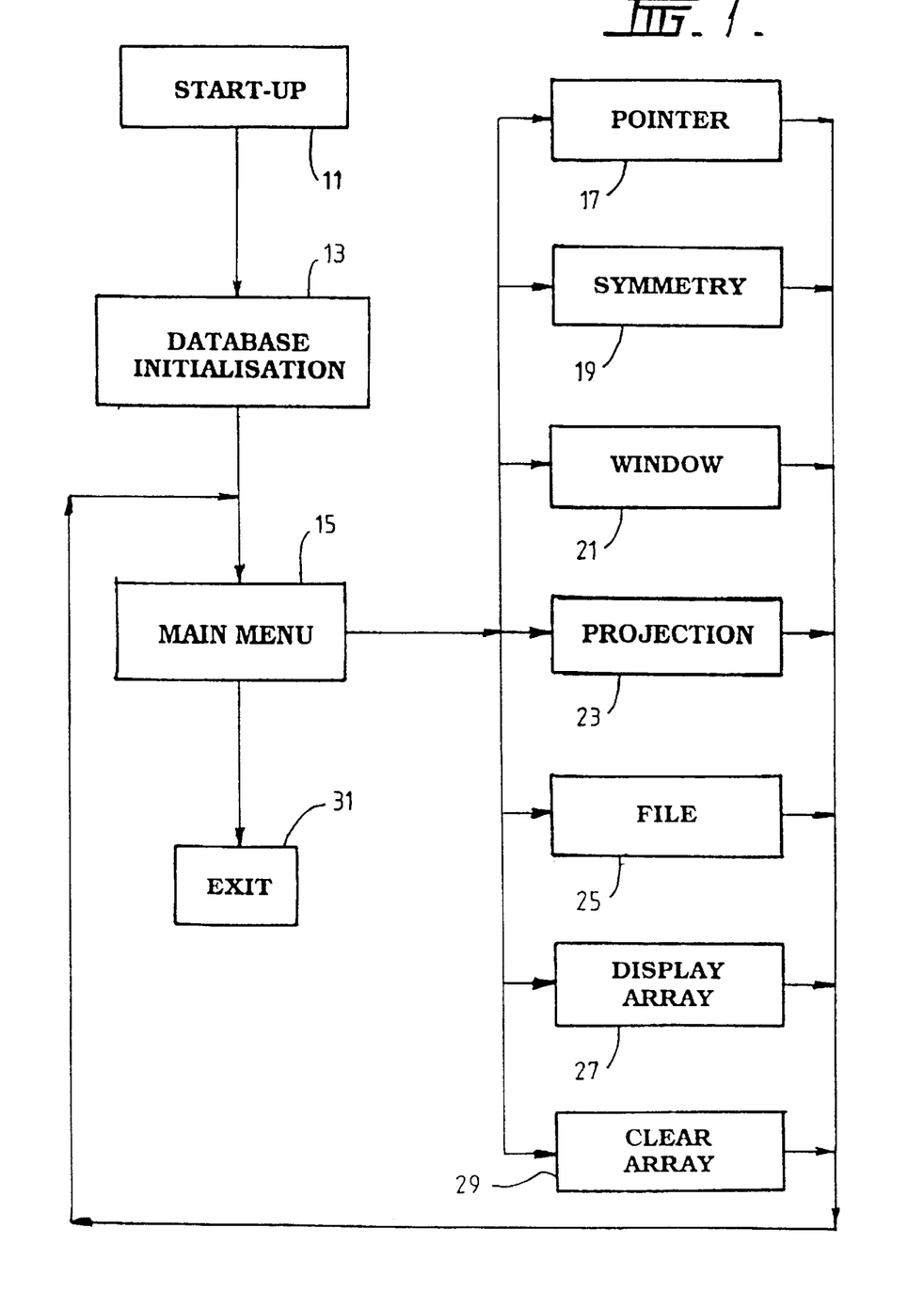
FIG. 1 is a flow chart of the functional routines performed by the orthogonal modelling display system.

The applications software comprises a computer program having a series of software routines and subroutines which are organised in a manner as generally indicated at FIG. 1 of the drawings.

Block 11 represents the start-up routine for the system which is entered upon invoking the relevant computer program of the applications software for the orthogonal modelling system. This routine initialises various counters and variables which are used during the running of the computer program.

Upon completing this initialisation, the program proceeds with a database initialisation routine represented by block whereby a series of arrays for forming a database are defined and established in the memory of the computer. These arrays define storage areas for storing processed data in the form of three dimensional cartasian co-ordinates, and display data in the form of two dimensional cartasian co-ordinates.

In the case of processed data, two sets of arrays are utilised, one for storing the current processed data and the other for storing transitional processed data, there being a one-to-one correspondence between the storage areas of the current array and transitional array, and also the display array. The transitional array simply provides a storage area for moving data to and from the current array for the purposes of performing arithmetic operations on the current data which are required to be performed when manipulating the processed data for graphical display purposes and when special CAD functions are desired to be performed by the operator, e.g. rotating the object image which is displayed etc.

In the case of both processed and display data, the present embodiment provides for one thousand storage locations each and therefore the arrays are initialised as X (1000), Y (1000), Z (1000) for current processed data storage purposes; DX (1000), DY (1000), DZ (1000) for transitional data storage purposes; and XP (1000), YP (1000) for display data storage purposes.

The relevance of the arrays will become clearer later, although it should be appreciated that the number of storage locations provided for each entry of the arrays is entirely arbitrary and is only limited by the memory size.

After the arrays are defined, the main menu routine represented by block 15 is invoked, where a choice of operations is provided to the user of the system via the display screen.

In the present embodiment, the orthogonal modelling system provides for a choice of operations similar to that provided by a conventional CAD system. These include pointer, symmetry, window, projection, file, display array, clear array and exit operations. Upon selecting the required operation from the main menu, the appropriate subroutine for the particular operation is invoked.

As shown in FIG. 1, the blocks which are representative of these subroutines are referenced as pointer 17, symmetry 19, window 21, projection 23, file 25, display array 27, clear array 29 and exit 31.

Briefly summarising these subroutines, the pointer subroutine 17 allows a cursor or pointer represented on the display screen to be moved on the screen in response to pressing directional keys of the keyboard or moving a digitising puck or mouse. Key presses are interpreted as units moved along either the X, Y or Z cartasian axis. The visual appearance of the movement along either axis is controlled by the choice of the particular orthogonal modelling system projection which has been previously defined by the user under the projection routine 23. If the projection routine has not been invoked by the user for expressly defining the projection variables, then default variables are utilised The manner in which the computer displays feedback to the display screen printer and handles data entry will be described in more detail later.

The symmetry subroutine 19 provides for a variety of symmetrical operations to be performed on the data which has previously been input and which is fedback on the graphical display. Examples of these operations include: rotation of an image or line about an axis, translation from a point, reflection through a plane, scaling along a set of axis, and inversion through a point. These symmetry operations may have differing effects on the data. For example, they may involve manipulation of existing data, generation of more data, or no change to the data at all. These operations are implemented in a similar manner to corresponding symmetrical operations performed by conventional CAD systems and hence will not be expanded upon further.

The window subroutine 21 makes available a series of screens having different units of measure which can be changed instantly. For example, the screen co-ordinates which are represented on the display screen or a window appearing thereon may be controlled by changing the number of units which can be displayed on the screen (i.e. zooming). Alternatively, the area of the screen co-ordinates which are displayed on the screen can be changed (i.e. moving). Again, the window subroutine is implemented in a similar manner to corresponding window operations performed by conventional CAD systems.

The projection subroutine 23 is especial to the orthogonal modelling system of the present invention, where three variables m, a, b are used to determine the orthogonal modelling display system projection to be used on the screen for data entry, and scaled output during printing. Generally, the orthogonal modelling display system projection controls the angle and the relationship between units along the Z axis, to units along the X and Y axes, when representing three dimensional data in two dimensions for graphical display purposes. The projection parameters will be described in more detail later.

The file subroutine 25 provides options for handling files of three dimensional data stored in the database. Such options include listing of available files, saving current data, retrieving data and saving two dimensional screen co-ordinates. The implementation of this subroutine is similar to corresponding file operations performed by conventional CAD systems.

The display array subroutine 27 provides for the display of the three dimensional co-ordinates of the end points of the drawing displayed upon the screen, i.e. the X Y Z co-ordinates, and is implemented in a conventional manner.

The clear array subroutine 29 simply involves clearing or reinitialising of the arrays of a particular file stored in the database in preparation for receiving new data in respect of an image to be created, and again is implemented in a conventional manner.

Finally, the exit subroutine 31 allows for the user to exit from the orthogonal modelling system program altogether.

With respect to the orthogonal modelling display system (OMDS) described above, the pointer subroutine 17 and projection subroutine 23 are most salient to the present invention. The pointer subroutine is invoked for the purposes of entering data into the system, and the projection subroutine is invoked to set the projection parameters relevant to the display of the data in two dimensions.

Figure 2:
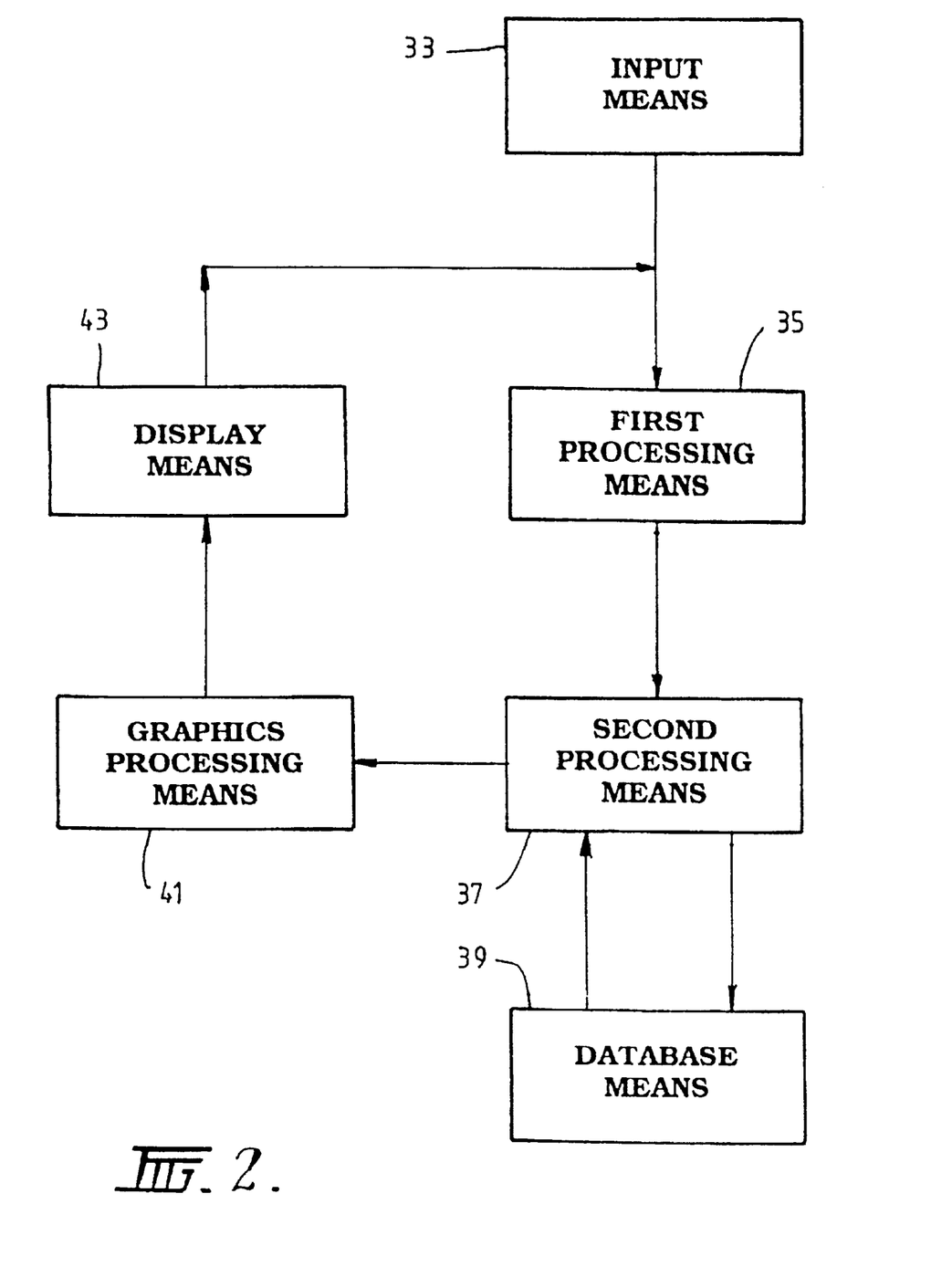
FIG. 2 is a block diagram illustrating the structural features of the orthogonal modelling display system for generating a graphical display.

With reference to FIG. 2 of the drawings, the orthogonal modelling system of this embodiment comprises input means 33, first processing means 35, second processing means 37, database means 39, graphics processing means 41 and display means 43.

The input means 33 comprises a peripheral input as previously described such as the keyboard, digitiser, mouse, puck etc. In one embodiment the input means 33 comprises the arrow keys on a keyboard for moving a cursor on a display screen which simulates a three dimensional space. Accordingly, the input means generates raw data which describes discrete points of the three dimensional object which is to be modelled by the system.

This raw data is subsequently received by the first processing means 35 which is designed to process this raw data by transposing it into processed data representative of discrete points in a three dimensional spatial array. This transposition is performed in accordance with a first mathematical algorithm which simply involves the transposition of raw data representative of a point into three dimensional cartasian co-ordinates.

The database means 39 is provided for receiving and storing the processed data in accordance with a prescribed data structure, being a two dimensional array in the form of a look-up table which is stored in the memory of the computer. The look-up table is arranged to store the cartasian co-ordinates of successive points represented by the processed data to form a database of three dimensional cartasian coordinates.

The second processing means 37 is arranged to receive the processed data either directly from the first processing means when the input means is activated, or from the database means 39 when processed data representative of a particular drawing which has previously been created is stored and is desired to be displayed.

The second processing means performs further processing of the processed data by transforming it into display data representative of the discrete points describing the three dimensional object, in a two dimensional display array. This transformation is performed in accordance with a second mathematical algorithm, hereinafter referred to as the OMDS transformation, which is especial to the present invention. The OMDS transformation preferably involves a transformation of data in three dimensional cartasian co-ordinates to two dimensional oblique co-ordinates in accordance with a prescribed formula and will be described in more detail later.

The graphics processing means 41 receives the display data and further modifies it depending upon the particular operation to be performed on it as chosen by the operator. Moreover, the graphics processing means 41 modifies the data where necessary to perform symmetry operations, windowing, projection, and other subroutines as previously described in relation to the flow chart shown at FIG. 1 of the drawings.

The display data, as generated directly from the second processing means 37 or as modified by the graphics processing means 41, is subsequently received by the display means 43 for graphically displaying the image represented there by in its two dimensional display array form.

As shown in FIG. 2 processed data is stored into the database 39 using the relevant input peripheral provided by the input means 33, e.g. keyboard and digitiser, and visual feedback of the image as represented by this processed data is provided on the display means 43, being the display screen and/or the printing device. Thus, raw data input into the system is interpreted in two ways:

(1) as information to be stored in the database 39; and
(2) as an update of the feedback image depicted on the display means 43.

Importantly, the display data for the screen feedback is generated using the OMDS transformation. This method of transformation has two major advantages over other methods of representing three dimensional measured data:

(i) measured data can be represented on a display screen with a set of cartasian axes X, Y and Z appearing at the same time; and
(ii) the orientation of the set of X, Y and Z axes remains the same for printouts. Consequently, the display screen and paper printouts can represent measured information which is stored in such a way that it can be retrieved at any time.

The OMDS transformation models three dimensional data onto two dimensional surfaces so that the X, Y and Z axis appear simultaneously, and measurements entered are always available. Moreover, the OMDS transformation utilises an oblique projection method of representing three dimensional objects in two dimensions which will now be described in detail.

Figure 3A:
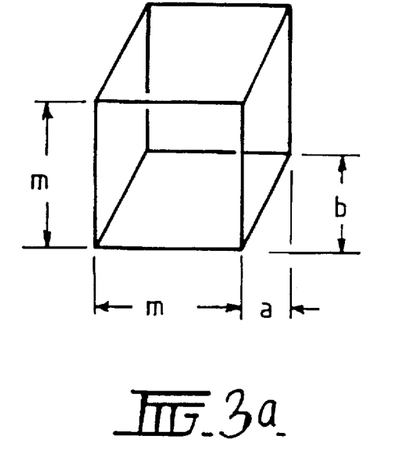
FIG. 3 is a series of drawings demonstrating the principle of the orthogonal modelling display system (OMDS) transformation; and, FIG. 4 is a flow chart of an algorithm for data entry used by the orthogonal modelling display system.

As shown in FIG. 3 of the drawings, a three dimensional cube is represented in two dimensions. The projection parameters m, a and b as shown in FIG. 3 (a), are defined so that "m" is the scale for the X and Y co-ordinates of the drawing as a whole, "a" is the abscissa component of the Z-axis projection of the object, and "b" is the ordinate component of the Z-axis projection of the object. Thus, the projection parameters can be set for any particular drawing which is to be created using the transformation, as [m: (a,b)].

Using the variables defined above the set of possible projection types can be described as the values that satisfy the following sequential inequalities:

i m>=1 ii a>=0 iii b>=a 1A picture plane is located to be coplanar with the XY plane, and at a position where its Z value is less than any Z value in the database. Lines are projected to the picture plane from each line of the database. Because the lines do not strike the picture plane at right angles the OMS projection is an oblique projection. The horizontal angle of the OMS projected line to a line that does make a right angle with the picture plane is atan(a/m), the vertical angle or azimuth is atan(b./m). The projection line subtends an overall angle of atan(sqrt($a^2+b^2$)/m) with a line projected at right angles to the picture plane.

In applying these projection parameters to a transformation of projection data in three dimensional cartasian co-ordinates to two dimensional oblique co-ordinates, the following formulae are used:

Display X=Processed X+(Processed Z×(a/m))

Display Y=Processed Y+(Processed Z×(b/m));

where Display X is the abscissa and Display Y is the ordinate of the particular projection point to be displayed, and Processed X, Processed Y and Processed Z are the corresponding abscissa, ordinate and Z-axis components of the projected point as represented by its corresponding processed data.

Figure 3B:
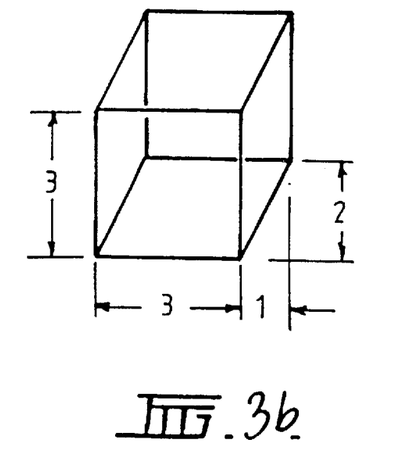
Figure 3C:
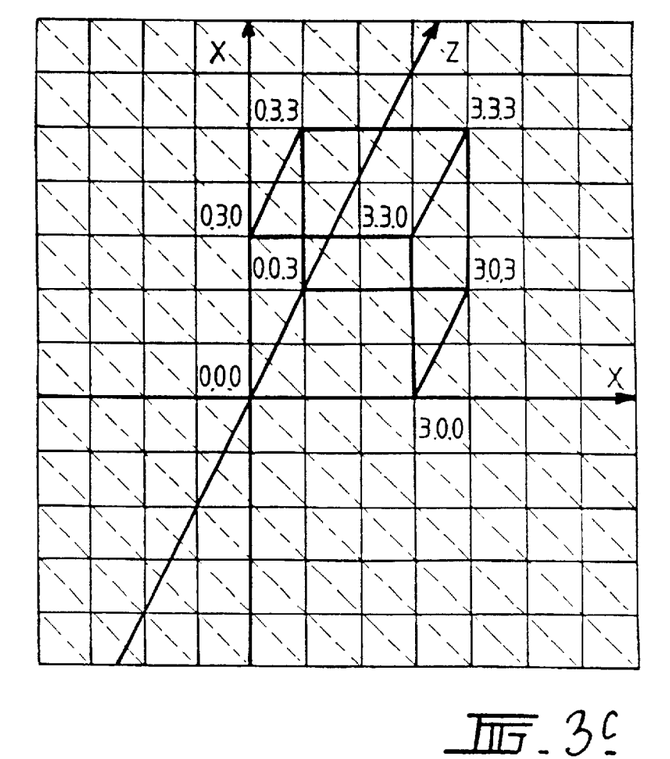

An example of a screen co-ordinate calculation will now be provided with reference to FIGS. 3(b) and 3(c).

In this example, the projection parameters [m: (a,b)] are chosen as [3: (1,2)] which define the cube shown in FIG. 3(b).

Taking the cartasian co-ordinate of the point (3, 0, 3), which is stored as processed data, the corresponding two dimensional display data for this, point would be calculated as follows:

$$Display\ X = Processed\ X + (Processed\ Z \times (a/m))$$

$$= 3 + (3 \times (1/3))$$

$$= 3 + (1)$$

$$= 4$$

$$Display\ Y = Processed\ Y = (Processed\ Z \times (b/m))$$

$$= 0 + (3 \times (2/3))$$

-continued $$= 0 + (2)$$

$$= 2$$

Thus the two dimensional display data for this particular point is (4, 2) and is graphically illustrated at FIG. 3(c).

From the above it can be seen that by using this transformation each point on the two dimensional display screen is interpreted as a three dimensional point on the database and vice versa. It should be noted, however, that a single point on the display screen may in fact represent two or more discrete points in three dimensions, and hence different points defined in the database may in fact be transformed into the same point onto the display screen.

Actual processed data stored as three dimensional cartasian co-ordinates in the database is sequentially generated by inputting raw data by the input means. For example, the up and down and left and right arrow keys of a PC keyboard may be operated by a user to move the pointer as displayed on the display screen along the X or Y axes and the Page Up and End keys to move the pointer along the Z axis to position the pointer at the desired location, and then the enter key may be depressed to enter the co-ordinates of the position of the pointer as processed data which is stored in the current array for containing all of such processed data of an image of an object.

In order to facilitate transposing of raw data into processed data, the present embodiment utilises a pointer window which defines the X, Y and Z co-ordinates of the pointer as displayed on the display screen. The pointer window is initialised with respect to the origin of the X, Y and Z axes, i.e. (0, 0, 0) and is serially incremented or decremented with respect to the X, Y or Z ordinate as the pointer is moved by the operator using the input means. Accordingly, positions in a theoretically infinite three dimensional spatial array, but in practical terms finite depending upon the size of the memory register accorded to the pointer window, are determined by the positioning of the pointer by the operator and are dependent upon the sequence, number and dimension of movements of the pointer made by the operator.

Importantly, from any three dimensional point within the three dimensional spatial array, and as depicted on the graphical display, it is possible to move along either the X, Y or Z axis. The move is recorded as a change in one of the ordinates until a desired point for the image of the object is located and entered for storage within the current array dedicated to the storage of processed data for the image. When the entry is made, the co-ordinate data appearing in the pointer window for each of the X, Y and Z co-ordinates is stored within a memory location of the array.

Thus, it should be appreciated that by adopting this method of creating an array of processed data relating to the image of an object and by using the OMDS transformation for feedback purposes to facilitate the operator entering the data, the information contained within the array is actually represented as measurement, not merely as a view or image. This should become clearer below.

Figure 4:
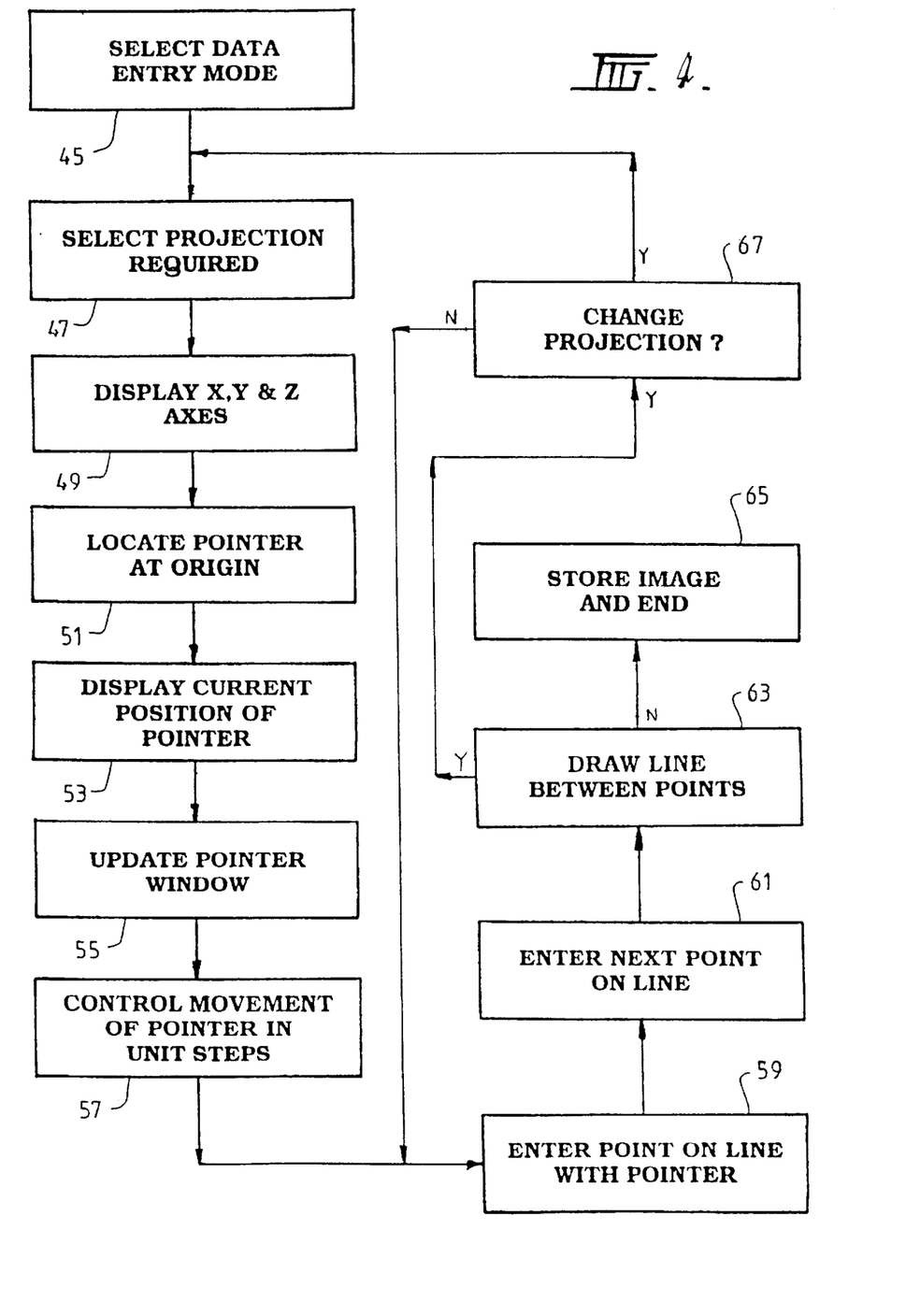

Having described the OMDS transformation in detail, the method used by the orthogonal modelling system for entering data will now be described with reference to FIG. 4 of the drawings.

After selecting the data entry mode of the orthogonal modelling system, as represented at block 45, the operator then is required at block 47 to choose the particular projection required from a range of values which have been predetermined, or otherwise sets his own range. In doing this, the software subroutine 23 is invoked, whereby the variables m, a and b are redefined for use in calculating the screen co-ordinates using the OMDS transformation.

Next, the operator enters the pointer subroutine 17, whereby the software presents the operator with a drawing of the X, Y and Z axes on the display screen, with the origin (0, 0, 0) being located in the middle of the screen. This is represented by block 49.

Next, as represented by block 51, software places a pointer or cursor at the origin, from which the pointer can be moved along each axis by pressing a key for the particular direction, or by moving a mouse or puck, whichever input peripheral is chosen or is available. In the present embodiment, the pointer can in fact be moved in both positive and negative directions.

As represented by block 53, the software displays the current position of the pointer numerically on the display screen adjacent to the pointer. For example, if the pointer is located at the origin at the outset, then (0, 0, 0) appears alongside the pointer. With successive movements of the pointer along one of the axis, the corresponding ordinate is incremented or decremented.

As represented at block 55, as the operator moves the pointer on the screen, the position is interpreted as a three dimensional position having X, Y and Z components. Any movement of the pointer results in the pointer window being updated with incremental/decremental data to identify the coordinates of the pointer within the three dimensional spatial array represented on the screen.

As represented by block 57, the software controls movements by the operator so that the pointer moves in one unit steps. A unit can be one inch, ten centimetres, one metre etc, dependent upon the particular scale which is chosen.

To enter a line or other graphic shape, the operator moves the pointer along each axis until the desired co-ordinate is reached, say (1, 1, 1), which is a positive step along each axis. When the desired point is reached, the operator enters the point as part of a line. This is represented by block 59.

The operator then moves the pointer along the relevant axis until the other end of the line is reached and that point is then entered, as represented at block 61.

Subsequently, the operator chooses to either draw another element or finish the drawing, as represented at block 63.

In the case that he wishes to draw another element, the software enables the operator to change the projection if desired, as represented by block 67. If no change is desired, the software allows for the operator to revert to the start of block 59.

In the case that the operator does desire to choose another projection, the subroutine returns back to block 47, allowing the operator to invoke the projection subroutine 23 once more.

If at block 63, the operator wishes to finish the drawing, the subroutine proceeds with storing the processed data representing the image of the object in a file and ends the session as represented at block 65.

It should be noted that with using the orthogonal modelling system as described, an operator has a measured drawing or image on both the display screen and printout. That is, the relationship between measurements along each axis is known at all times. Thus, the software does not change the represented length of the line in order to obtain a particular view. From this representation, all the measured data can be retrieved at any stage of data entry or retrieval, and will always appear on the display screen and printout in the same way that it is entered. This relationship between measurements along each axis becomes extremely powerful when the projection parameters are chosen so that m=a+b.

The projection technique using the OMDS transformation allows the orthogonal modelling system of the present embodiment to dispense with the need for developing a view or "simulated photograph" as do current CAD systems, since it provides a way of entering and storing measured data so that all three axial dimensions are available simultaneously. Thus, it is a "real" three dimensional measured drawing system, rather than a simulated one.

It is important to note that the projection method of the OMDS transformation used in the orthogonal modelling system of the present embodiment has an outstanding capability when projection variables m, a, b satisfy the equation m=a+b.

In this situation, three dimensional co-ordinates relate to a two dimensional square grid in such a way that a 45 degree line drawn on the opposite angle to the Z axis, subdivides the Z axis into the same number of units as the X and Y axes as shown by the broken lines in FIG. 3(c). For example, when m=3, a=1 and b=2, and the cube as shown in FIG. 3(b) is generated, three units along the Z axis can be visually counted on the screen or in printouts at the points of intersection between the 45 degree broken lines and the projected line of the cube in the Z axis direction. It is believed that no other CAD system can provide this facility.

It will be apparent that the described embodiment of the three dimensional computer drawing system has numerous advantages compared to existing three dimensional CAD software programmes, including the following advantages:

(i) This drawing system transforms the two dimensional computer screen into simulated three dimensional space and allows the operator to enter data by way of cursor/pointer directly in three dimensional form, without reference to any two dimensional plans, sections, elevationstor other two dimensional visually aided programmes, systems or concepts.

(ii) It eliminates the need to input information in two dimensional form in order to obtain a three dimensional view/image.

(iii) While inputting information in three dimensional form by way of cursor/pointer an operator knows where they are at all times on the screen.

(iv) All three dimensional information inputted is to scale(of the operator's choice) at all times.

(v) While inputting information in three dimensional form by way of cursor/pointer, the distance and measurements from one object to another is known at all times.

(vi) Three dimensional measured data can be represented on a display screen with a set of cartasian axes X, Y and Z appearing at the same time, and the orientation of the set of X, Y and Z axes remains the same for the printout.

(vii) The operator can move along either the X, Y or Z axis from any three dimensional point within the spatial array and as depicted on the graphical display.

(viii) The operator can move the cursor/pointer through the three dimensional space leaving a trail behind which represents a measured line and can draw with six degrees of freedom inside the three dimensional space.

It should be appreciated that the present invention is not limited to the specific embodiment described herein and accordingly other embodiments involving modifications or changes in the arrangement of the routines and algorithms defined thereby, which changes and modifications all form part of common general knowledge of CAD system design, are deemed to still fall within the spirit of the present invention.

In particular, it should be appreciated that the invention is not limited to transposing data into three dimensional cartasian co-ordinates and transforming it into two dimensional cartasian co-ordinates. For example processed data may be represented in polar co-ordinates, in which case the actual transformation used would be different to achieve the same effect. Obviously the invention can be adapted to suit other co-ordinate systems which may have utility.

Furthermore, the present invention may be combined with other known CAD algorithms to provide conventional drawing techniques such as hidden line removal and rendering of objects.

The claims defining the invention are as follows:

1. A graphical display generating system for modelling three dimensional objects on a two dimensional graphical display, the system comprising:

input means for generating raw data representative of discrete three dimensional points of said object;

first processing means for receiving and processing said raw data from said input means by transposing said raw data into processed data representative of said discrete points in a three dimensional spatial array, the transposition being performed in accordance with a first mathematical algorithm;

second processing means for receiving and further processing said processed data by transforming said processed data into display data representative of said discrete points in a two dimensional display array, the transformation being performed in accordance with a second mathematical algorithm; and, display means for graphically displaying the image represented by said display data in said two dimensional display array.

2. A graphical display generating system as defined in claim 1, wherein said first mathematical algorithm comprises a transposition of data to three dimensional cartasian co-ordinates.

3. A graphical display generating system as defined in claim 2, wherein said second mathematical algorithm comprises a transformation of data in three dimensional cartasian co-ordinates to two dimensional oblique co-ordinates using the formulae:

$$\text{Display X} = \text{Processed X} + (\text{Processed Z} \times (a/m))$$

$$\text{Display Y} = \text{Processed Y} + (\text{Processed Z} \times (b/m));$$

where:

Display X is the abscissa and Display Y is the ordinate of the display data,

Processed X, Processed Y and Processed Z are the corresponding abscissa, ordinate and Z-axis components of the processed data, and m, a and b are the projection parameters for the display data where m is the scale for the X and Y co-ordinates of the display data, a is the abscissa component of the Z-axis projection of the display data, and b is the ordinate component of the Z-axis projection of the display data.

4. A graphical display generating system as defined in claim 1, wherein said system further includes a database means for receiving and storing said processed data in a prescribed data structure.

5. A graphical display generating system as defined in claim 4, wherein said second processing means receives said processed data from either said first processing means or said database means.

6. A graphical display generating system as defined in claim 5, wherein said prescribed data structure is a two dimensional array in the form of a look-up table.

7. A graphical display generating system as defined in claim 1, wherein said input means comprises cursor positioning means for moving a cursor on a two dimensional simulation of three dimensional space.

8. A method of generating a graphical display for modelling three dimensional objects on a two dimensional graphical display, the method comprising the steps of:

generating raw data representative of discrete three dimensional points of said object;

transposing said raw data into processed data representative of said points in a three dimensional spatial array in accordance with a first mathematical algorithm;

transforming said processed data into display data representative of said discrete points in a two dimensional spatial array in accordance with a second mathematical algorithm; and graphically displaying said display data in said two dimensional spatial array.

9. A method of generating a graphical display as defined in claim 8, wherein said first mathematical algorithm comprises a transposition of data to three dimensional cartasian co-ordinates.

10. A method of generating a graphical display as defined in claim 9, wherein said second mathematical algorithm comprises a transformation of data in three dimensional cartasian co-ordinates to two dimensional oblique co-ordinates using the formulae:

$$\text{Display X} = \text{Processed X} + (\text{Processed Z} \times (a/m))$$

$$\text{Display Y} = \text{Processed Y} + (\text{Processed z} \times (b/m));$$

where:

Display X is the abscissa and Display Y is the ordinate of the display data, processed X, Processed Y and Processed Z are the corresponding abscissa, ordinate and Z-axis components of the processed data, and m, a and b are the projection parameters for the display data where m is the scale for the X and Y co-ordinates of the display data, a is the abscissa component of the Z-axis projection of the display data, and b is the ordinate component of the Z-axis projection of the display data.

11. A method of generating a graphical display as defined in claim 10, wherein the projection variables m, a and b are selected so as to satisfy the equation:

$$m = a + b.$$

12. A method of generating a graphical display as defined in claim 8, wherein said raw data is generated by moving a cursor on a two dimensional simulation of three dimensional space.

* * * * *